United States Patent
Hodges et al.

(10) Patent No.: US 11,443,269 B2
(45) Date of Patent: Sep. 13, 2022

(54) REAL-TIME PARCEL DELIVERY MANAGEMENT IN AN INTERNET OF THINGS (IOT) COMPUTING ENVIRONMENT

(71) Applicant: INTERNATIONAL BUSINESS MACHINES CORPORATION, Armonk, NY (US)

(72) Inventors: Brent Hodges, Raleigh, NC (US); John E. Moore, Jr., Pflugerville, TX (US); Gregory J. Boss, Saginaw, MI (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 420 days.

(21) Appl. No.: 16/102,617

(22) Filed: Aug. 13, 2018

(65) Prior Publication Data
US 2020/0051000 A1    Feb. 13, 2020

(51) Int. Cl.
*G06Q 10/08*    (2012.01)

(52) U.S. Cl.
CPC ................... *G06Q 10/083* (2013.01)

(58) Field of Classification Search
CPC ................................................ G06Q 10/083
See application file for complete search history.

(56) References Cited

U.S. PATENT DOCUMENTS

| | | |
|---|---|---|
| 6,725,127 B2 | 4/2004 | Stevens |
| 11,232,394 B1 * | 1/2022 | Pinette .................. G06N 20/00 |
| 2006/0235739 A1 * | 10/2006 | Levis ..................... G06Q 10/08 705/1.1 |
| 2012/0030133 A1 * | 2/2012 | Rademaker ............ G06Q 10/08 705/333 |
| 2015/0120094 A1 * | 4/2015 | Kimchi .................... G05D 1/00 701/3 |
| 2015/0154559 A1 * | 6/2015 | Barbush ........... G06Q 10/08355 705/338 |
| 2015/0227882 A1 * | 8/2015 | Bhatt ............... G06Q 10/08355 705/330 |
| 2017/0147976 A1 | 5/2017 | Koch et al. |
| 2017/0255902 A1 | 9/2017 | Jalaldeen et al. |

OTHER PUBLICATIONS

Raphaelle Ducret, Parcel deliveries and urban logistics: Changes and challenges in the courier express and parcel sector in Europe, 2014, p. 15-22 (Year: 2014).*

* cited by examiner

*Primary Examiner* — Resha Desai
*Assistant Examiner* — Ibrahim N El-Bathy
(74) *Attorney, Agent, or Firm* — Griffiths & Seaton PLLC (57) ABSTRACT

A system and method for managing real time parcel delivery in an internet of things (IoT) computing environment are presented. One or more intercepting locations may be identified and determined to replace an originally scheduled delivery location for real-time delivery of a parcel to a recipient using one or more IoT computing devices. The one or more intercepting locations may be selected to replace the originally scheduled location for real-time delivery of the parcel to the recipient using the one or more IoT computing devices. Real-time delivery of the parcel to the one or more intercepting locations may be arranged/coordinated between a delivery service and the recipient.

20 Claims, 6 Drawing Sheets

REAL-TIME PARCEL DELIVERY MANAGEMENT IN AN INTERNET OF THINGS (IOT) COMPUTING ENVIRONMENT

BACKGROUND OF THE INVENTION

Field of the Invention

The present invention relates in general to computing systems, and more particularly to, various embodiments for managing real time parcel delivery in an internet of things (IoT) computing environment by a processor.

Description of the Related Art

In today's society, consumers, business persons, educators, and others use various computing network systems with increasing frequency in a variety of settings. For example, processing devices, with the advent and further miniaturization of integrated circuits, have made it possible to be integrated into a wide variety of devices. The advent of computers and networking technologies have made possible the increase in the quality of life while enhancing day-to-day activities. Computing systems can include an Internet of Things (IoT), which is the interconnection of computing devices scattered across the globe using the existing Internet infrastructure. IoT devices may be embedded in a variety of physical devices or products. As great strides and advances in technologies come to fruition, the greater the need to make progress in these systems advantageous for efficiency and improvement.

SUMMARY OF THE INVENTION

Various embodiments for managing real time parcel delivery in an internet of things (IoT) computing environment using one or more processors are provided. In one embodiment, by way of example only, a method for managing real time parcel delivery in an internet of things (IoT) computing environment, again by a processor, is provided. One or more intercepting locations may be identified and determined to replace an originally scheduled delivery location for real-time delivery of a parcel to a recipient using one or more IoT computing devices. The one or more intercepting locations may be selected to replace the originally scheduled location for real-time delivery of the parcel to the recipient using the one or more IoT computing devices. Real-time delivery of the parcel to the one or more intercepting locations may be arranged/coordinated between a delivery service and the recipient.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

As a preliminary matter, computing systems may include large scale computing called "cloud computing," in which resources may interact and/or be accessed via a communications system, such as a computer network. Resources may be software-rendered simulations and/or emulations of computing devices, storage devices, applications, and/or other computer-related devices and/or services run on one or more computing devices, such as a server. For example, a plurality of servers may communicate and/or share information that may expand and/or contract across servers depending on an amount of processing power, storage space, and/or other computing resources needed to accomplish requested tasks. The word "cloud" alludes to the cloud-shaped appearance of a diagram of interconnectivity between computing devices, computer networks, and/or other computer related devices that interact in such an arrangement.

Additionally, the Internet of Things (IoT) is an emerging concept of computing devices that may be embedded in objects, especially appliances, and connected through a network. An IoT network may include one or more IoT devices or "smart devices", which are physical objects such as appliances with computing devices embedded therein. Many of these objects are devices that are independently operable, but they may also be paired with a control system or alternatively a distributed control system such as one running over a cloud computing environment.

Moreover, with the proliferation of online buying (e.g., "e-commerce"), shipping and delivery have become a major part of sellers' and buyers' overall purchasing experience. Especially challenging are expensive items which require the recipient to acknowledge receipt of delivery often validated from a signature by the recipient. However, required acknowledgement may indicate a), the shipping company must make several unsuccessful delivery attempts before the recipient can sign for the item, b), the recipient must travel to the shipper's warehouse after a specified date and time to sign for the item, or c), the recipient must sign for the item in advance. Each of these alternatives have significant drawbacks. In case a), the shipper must make unnecessary; time consuming unsuccessful delivery attempts and the recipient is delayed in receiving the delivery. In case b), the recipient must wait for a designated date and time, drive to the shipper's warehouse, wait in line and sign for the shipment. In case c) because the recipient signed for the receipt of delivery in advance, if the package is either lost or stolen, the recipient may have already assumed responsibility and risk losing the entire value of the delivery item.

Accordingly, various embodiments, as described herein, provide a solution that eliminates all three of these challenges by eliminating a), the unsuccessful delivery attempts, b), the need for the recipient to wait for a specified future date to drive to the shipper's warehouse and c), the liability of a lost or stolen package. Also, although a drivers' delivery areas may be fixed, the driver's specific route for a given day may somewhat vary based on the specific delivery addresses for that day. The shipping company's routing application may be modified to include intercept locations, which are a specified distance away from residential delivery addresses, to eliminate the possibility that a recipient is waiting to meet the driver in front of someone else's home.

Thus, the present invention provides for offering a real time package delivery ("RTD") service, where several intercept locations along a planned route may be designated. A recipient may register to use the shipper's RTD service and agree to meet the driver at one of these intercept points at a designated time to take delivery of their package. Thus, the present invention may manage the delivery service/driver's route, selection of one or more recommended intercept points, the recipients desire to activate the service and the coordination of the driver, recipient and each the recommended intercept points.

For example, assume the recipient is anxious to receive a new smart phone which is scheduled to be delivered today. Because recipient had previously registered for an RTD service of a delivery service, the recipient may use an application ("App") to activate the RTD service for delivery of the package. Using the planned delivery route, the RTD service provides recipient with one or more intercept locations, where recipient is able meet the driver of the delivery service to receive the parcel (e.g., the new smart phone). After the recipient selects a location, the RTD service notifies the delivery service/driver and the intercept location is confirmed for recipient. As the driver of the delivery service nears the intercept location (e.g., a defined distance from the intercept location), an approximate arrival time of the driver of the delivery service may be suggested or provided to the recipient. After the recipient confirms arrival at the intercept location, the delivery service driver is notified that recipient is at that location, including a vehicle description and global positioning satellite ("GPS") coordinates. The delivery service driver may deliver the new smart phone to the recipient.

In an additional aspect, various embodiments are provided herein for managing real time parcel delivery in an IoT computing environment. One or more intercepting locations may be identified and determined to replace an originally scheduled delivery location for real-time delivery of a parcel to a recipient using one or more IoT computing devices. The one or more intercepting locations may be selected to replace the originally scheduled location for real-time delivery of the parcel to the recipient using the one or more IoT computing devices. Real-time delivery of the parcel to the one or more intercepting locations may be arranged/coordinated between a delivery service and the recipient.

In one aspect, for managing real time parcel delivery in an IoT computing environment, the present invention may dynamically and/or automatically detect a recipient of a parcel that is "in route" and scheduled for delivery is no longer at the scheduled location for receiving the package. As such, the present invention may automatically locate the use via one or more IoT computing device (e.g., GPS tracking) and identify and/or recommend (e.g., intelligently/ cognitively identifying and recommending) to the recipient, the delivery service, or both one or more intercepting points.

The recommended intercepting points may be one or more locations accessible to both the user and the delivery service. For example, the present invention may parse textual data (e.g., a calendar of the user) on an IoT device to learn one or more scheduled meetings at one or more locations. The present invention may also learn and track a delivery route of the delivery service to identify and/or learn one or more one or more locations which may be within a selected distance from the at one or more locations of a schedule meeting of a user.

In an additional aspect, the present invention may continuously monitor one or more data sources of both the user and the delivery service to predict the recipient will be departing from the scheduled delivery location within a predicted delivery time. As such, the present invention may predict and/or recommend one or more one or more intercepting points for the recipient to receive the delivery.

In an additional aspect, the present invention may learn of one or more scheduled deliveries (e.g., a subscription service where one or more parcels are delivered on a timed schedule) and also learn and/or predict one or more behavior patterns and/or activities of daily living ("ADL") of a recipient. For example, the present invention may learn or predict the recipient always leaves their home for two weeks during a defined period of time to go on vacation and will be unavailable to receive the delivery parcel. The present invention may also learn delivery patterns for each driver/ vehicle of a delivery service. Thus, the present invention may manage managing real time parcel delivery in an IoT computing environment by recommending one or more intercepting points and/one or more preapproved/authorized third party recipients for the recipient to receive the delivery upon detecting/determining the originally scheduled delivery service conflicts with the learned/predicted behavior patterns of the user and/or delivery patterns of each driver/ vehicle of a delivery service.

It should be notated that as used herein, a delivery service may include use of cars, trucks, trains, trams, bicycles, motorcycles, buses, trolleys, boats, airplanes, off-road/utility vehicles, drones, and/or other mobile objects. Thus, reference to "delivery service" or "deliver truck" are used by way of example only and may be used interchangeably with any of these listed means of transportation.

It should be noted as described herein, the term "cognitive" (or "cognition") may be relating to, being, or involving conscious intellectual activity such as, for example, thinking, reasoning, or remembering, that may be performed using a machine learning. In an additional aspect, cognitive or "cognition may be the mental process of knowing, including aspects such as awareness, perception, reasoning and judgment. A machine learning system may use artificial reasoning to interpret data from one or more data sources (e.g., sensor based devices or other computing systems) and learn topics, concepts, and/or processes that may be determined and/or derived by machine learning.

In an additional aspect, cognitive or "cognition" may refer to a mental action or process of acquiring knowledge and understanding through thought, experience, and one or more senses using machine learning (which may include using sensor based devices or other computing systems that include audio or video devices). Cognitive may also refer to identifying patterns of behavior, leading to a "learning" of one or more events, operations, or processes. Thus, the cognitive model may, over time, develop semantic labels to apply to observed behavior and use a knowledge domain or ontology to store the learned observed behavior. In one embodiment, the system provides for progressive levels of complexity in what may be learned from the one or more events, operations, or processes.

In additional aspect, the term cognitive may refer to a cognitive system. The cognitive system may be a specialized computer system, or set of computer systems, configured with hardware and/or software logic (in combination with hardware logic upon which the software executes) to emulate human cognitive functions. These cognitive systems apply human-like characteristics to convey and manipulate ideas which, when combined with the inherent strengths of digital computing, can solve problems with a high degree of accuracy (e.g., within a defined percentage range or above an accuracy threshold) and resilience on a large scale. A cognitive system may perform one or more computer-implemented cognitive operations that approximate a human thought process while enabling a user or a computing system to interact in a more natural manner. A cognitive system may comprise artificial intelligence logic, such as natural language processing (NLP) based logic, for example, and machine learning logic, which may be provided as specialized hardware, software executed on hardware, or any combination of specialized hardware and software executed on hardware. The logic of the cognitive system may implement the cognitive operation(s), examples of which include, but are not limited to, question answering, identification of related concepts within different portions of content in a corpus, and intelligent search algorithms, such as Internet web page searches.

In general, such cognitive systems are able to perform the following functions: 1) Navigate the complexities of human language and understanding; 2) Ingest and process vast amounts of structured and unstructured data; 3) Generate and evaluate hypotheses; 4) Weigh and evaluate responses that are based only on relevant evidence; 5) Provide situation-specific advice, insights, estimations, determinations, evaluations, calculations, and guidance; 6) Improve knowledge and learn with each iteration and interaction through machine learning processes; 7) Enable decision making at the point of impact (contextual guidance); 8) Scale in proportion to a task, process, or operation; 9) Extend and magnify human expertise and cognition; 10) Identify resonating, human-like attributes and traits from natural language; 11) Deduce various language specific or agnostic attributes from natural language; 12) Memorize and recall relevant data points (images, text, voice) (e.g., a high degree of relevant recollection from data points (images, text, voice) (memorization and recall)); and/or 13) Predict and sense with situational awareness operations that mimic human cognition based on experiences.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

It should be noted that one or more calculations may be performed using various mathematical operations or functions that may involve one or more mathematical operations (e.g., solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.).

Other examples of various aspects of the illustrated embodiments, and corresponding benefits, will be described further herein.

As previously stated, cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
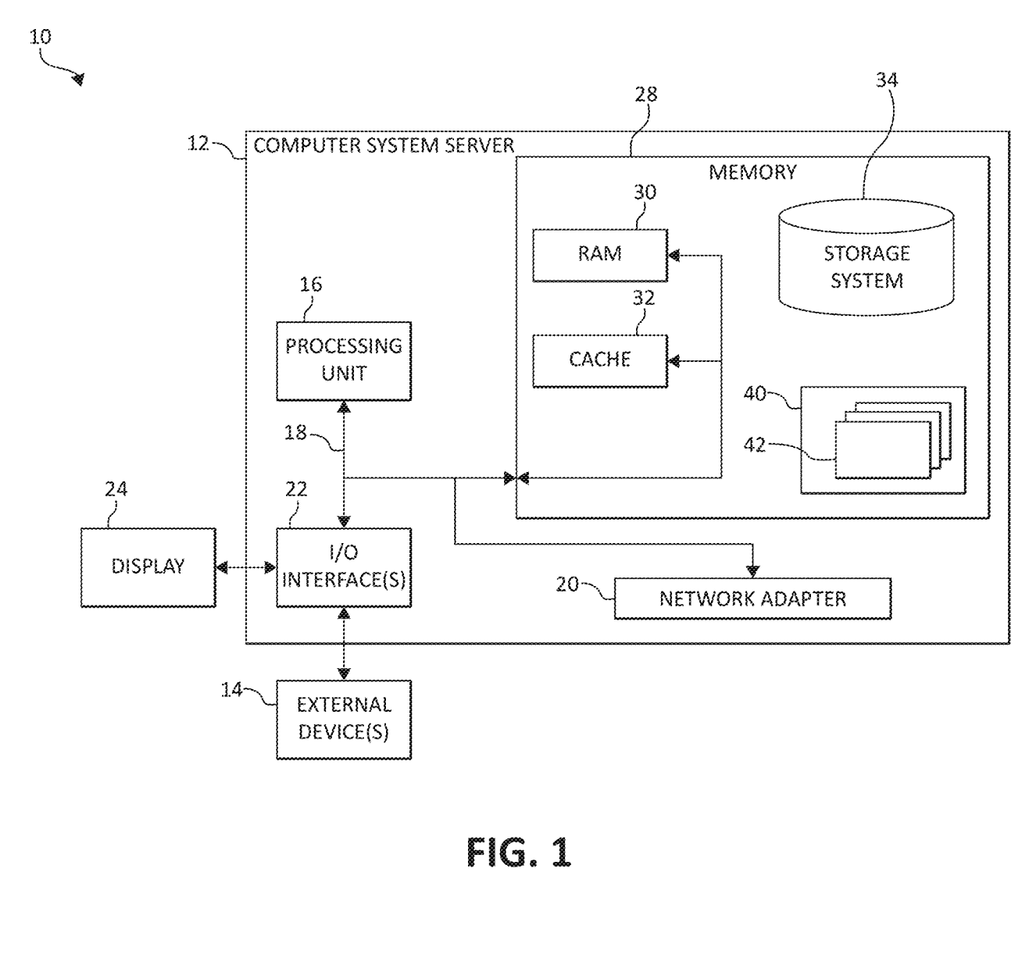
FIG. 1 is a block diagram depicting an exemplary computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 (e.g., a cognitive system), which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
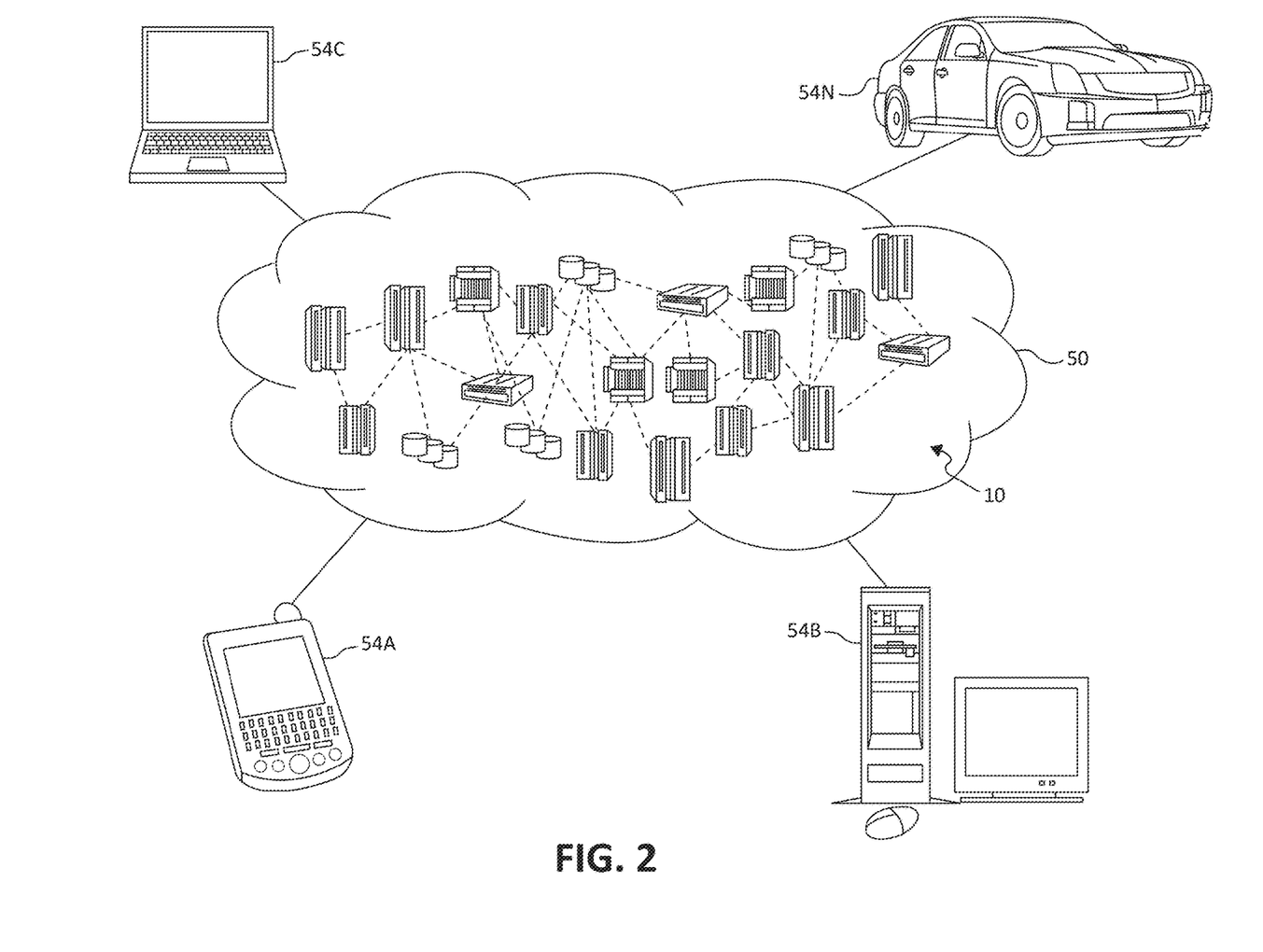
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
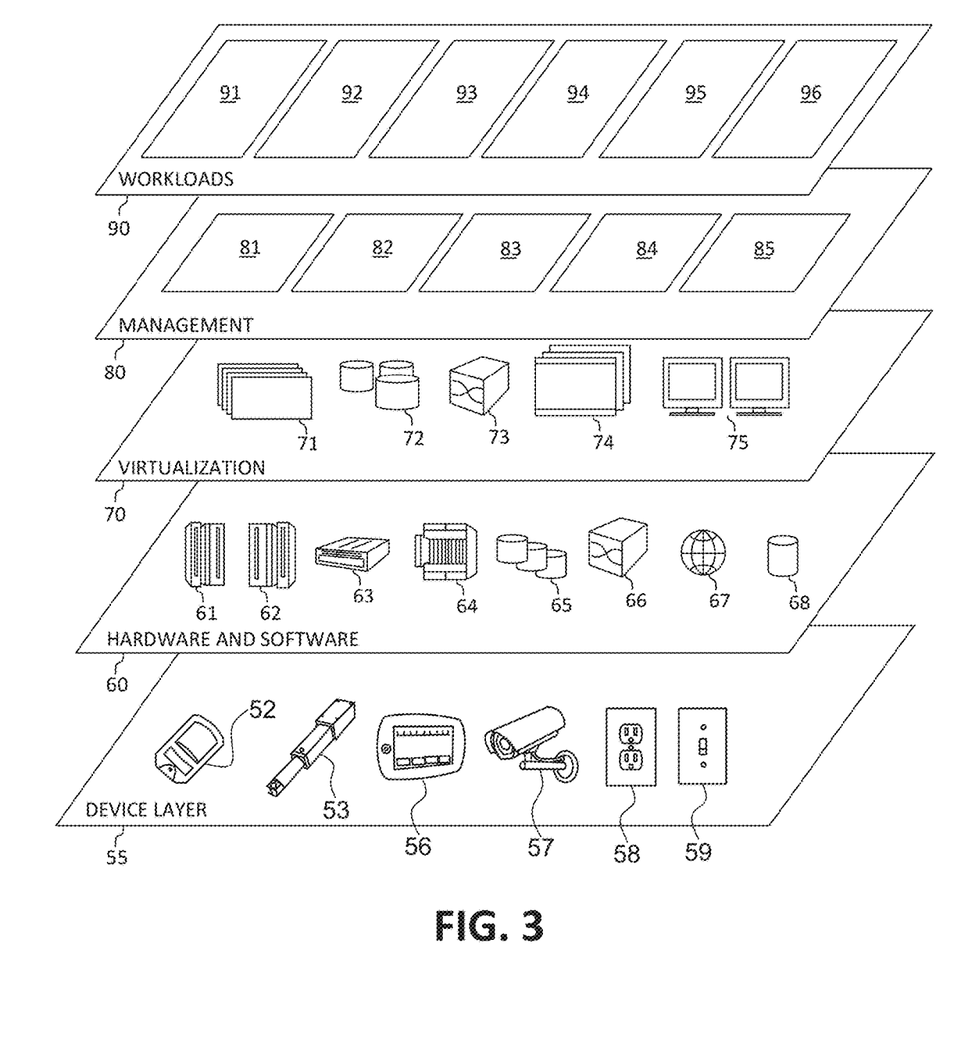
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various real time parcel delivery management workloads and functions 96. In addition, real time parcel delivery management workloads and functions 96 may include such operations as data analytics, data analysis, and as will be further described, notification functionality. One of ordinary skill in the art will appreciate that the real time parcel delivery management workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
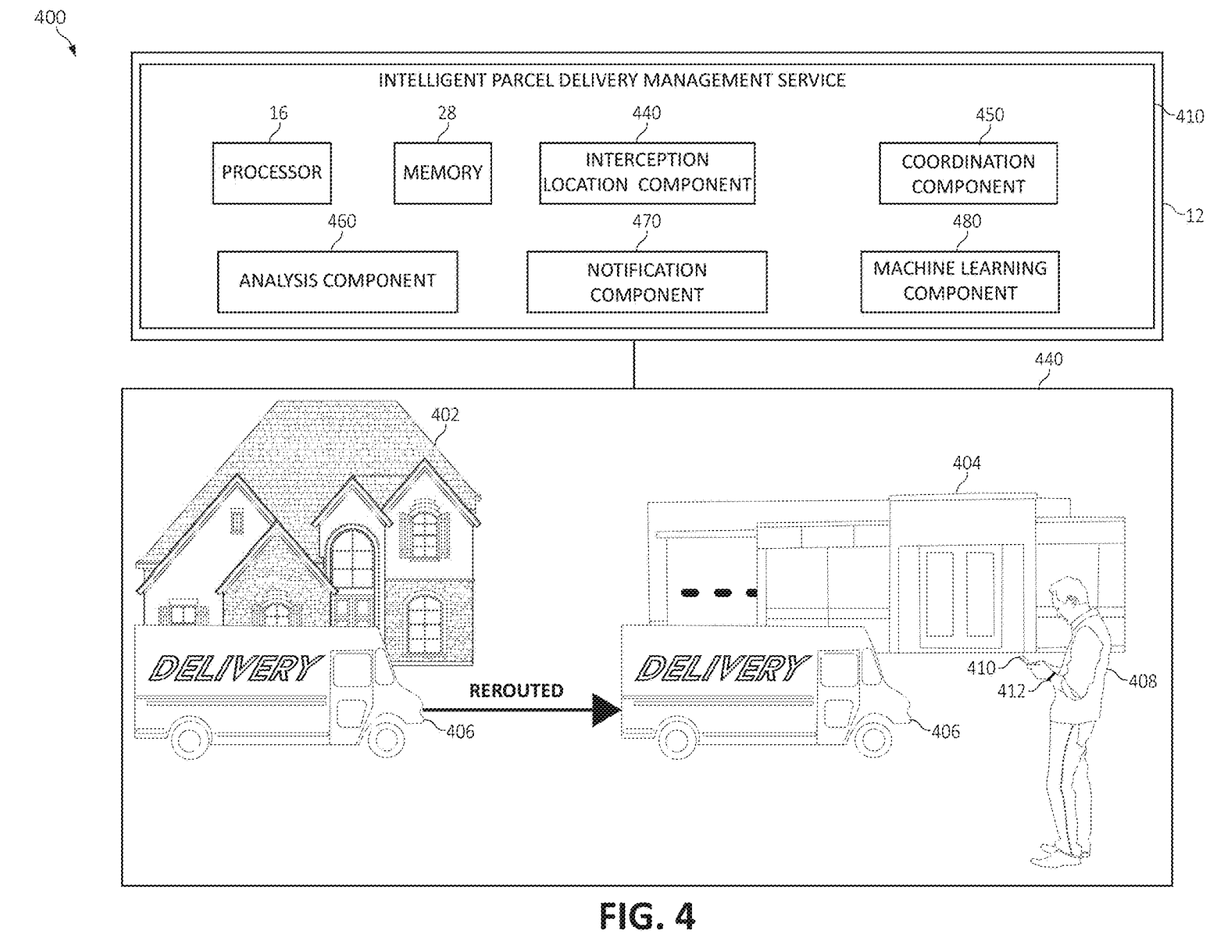
FIG. 4 is an additional block diagram depicting an exemplary functional relationship between various aspects of the present invention.

Turning now to FIG. 4, a block diagram depicting exemplary functional components 400 according to various mechanisms of the illustrated embodiments is shown. In one aspect, one or more of the components, modules, services, applications, and/or functions described in FIGS. 1-3 may be used in FIG. 4. An intelligent parcel delivery management service 410 (e.g., real time package delivery "RTD" service) is shown, incorporating processor 16 of FIG. 1 to perform various computational, data processing and other functionality in accordance with various aspects of the present invention.

The intelligent parcel delivery management service 410 may be provided by the computer system/server 12 of FIG. 1, which may also include memory 28 of FIG. 1. The processor 16 may be in communication with memory 28. The intelligent parcel delivery management service 410 may include an interception location component 440, a coordination component 450, an analysis component 460, a notification component 470, and/or a machine learning component 480.

As one of ordinary skill in the art will appreciate, the depiction of the various functional units in intelligent parcel delivery management service 410 is for purposes of illustration, as the functional units may be located within the intelligent parcel delivery management service 410 or elsewhere within and/or between distributed computing components.

In one aspect, one or more interception location component 440 may be determined and/or identified via interception location component 440 to replace an originally scheduled delivery location such as, for example, location 402 (e.g., a house of a user) for real-time delivery of a parcel to a recipient 408 using one or more IoT computing devices. The one or more intercepting locations such as, for example, location 404 may be selected to replace the originally scheduled location 402 for real-time delivery of the parcel to the recipient using the one or more IoT computing devices. Real-time delivery of the parcel to the one or more intercepting locations may be arranged/coordinated between a delivery service (e.g., using vehicle 406) and the recipient 408.

One or more intercepting locations such as, for example, location 404 may be selected, using the intercepting to replace an originally scheduled location for real-time delivery of a parcel to the recipient 408 using one or more IoT computing devices. The arrangement may enable a delivery services (e.g., using vehicle 406) to provide the real-time delivery of the parcel to one or more intercepting locations.

The interception location component 440 may identify the one or more intercepting locations (e.g., location 404) available to the recipient of the parcel, available to the delivery service (e.g., using vehicle 406), available to an identified third party approved for receiving the parcel, or a combination thereof. In an additional aspect, the interception location component 440 may identify the one or more intercepting locations (e.g., location 404) according calendar data, location information of one or more IoT computing devices associated with the recipient 408, location information of one or more vehicles, or a combination thereof. Also, if needed, an updated delivery time may be selected and/or determined to replace an original location time at the one or more intercepting locations.

The notification component 470 may notify the delivery service of the one or more intercepting locations (e.g., location 404), a parcel identifier (ID), a name of the recipient (e.g., name of recipient 408), vehicle 406 information associated with the recipient, location information of vehicle 406 and/or one or more IoT computing devices 412 and/or 414 (e.g., smart phone, wearable sensors/smart watch, cameras, or other IoT devices) associated with the recipient 408, location information of the vehicle 406 associated with the recipient, or a combination thereof. A location of the vehicle 406 associated with the recipient 408 may be provided via an in-car navigation device, such as a personal navigation device (PND) or integrated device, or may be provided as an input to an Advanced Driver Assistance System (ADAS).

For example, the interception location component 440, using natural language processing ("NLP") may parse and analyze a calendar of recipient 408 and identify scheduled events, tasks, meetings, and the like to identify locations and times available to the recipient 408 for receiving the parcel. For example, the intercepting location 404 may be an office where the recipient 408 is having a meeting at 9:00 a.m. and would be available to meet the delivery service at 10:00 a.m. for pickup. Also, the interception location component 440 may detect (in association with or independent from parsing the calendar) that the recipient 408 is located at interception location 404 (which may be an exercise facility). Using analysis component 460 (which may be in communication with a driver/delivery location service) identify a location and delivery schedule of the delivery service (e.g., using vehicle 406). Using the collected feedback, the interception location component 440 may arrange and coordinate the time and location 404 suitable to both the recipient and the delivery service for delivering the package.

The notification component 470 may also alert the recipient 408 of an arrival time of a transport/delivery vehicle delivering the parcel to one or more intercepting locations (e.g., location 404). Additionally, the notification component 470 may also alert a delivery service (e.g., vehicle 406) that the recipient 408 has arrived and/or is located at one or more intercepting locations (e.g., location 404) along with providing vehicle description and GPS coordinates of the vehicle and/or recipient 408. The analysis component 460 may sort the one or more intercepting locations according to defined delivery criteria.

In one aspect, the machine learning component 480 may collect and learn behavioral data of each recipient (e.g., recipient 408) over a course of a selected time period to assist with suggesting and identifying the interception locations. For example, the machine learning component 480 may collect feedback data from one or more IoT computing devices associated with the recipient 408, the delivery service, and/or associated with the recipient 408. The machine learning component 480 may learn and identify behavior patterns, schedules, and/or even activities of daily living (ADL) and context of daily living (CDL). The machine learning component 480 may also use one or more machine learning operations such as, for example, an instance of IBM® Watson® such as Watson® Analytics (IBM® and Watson® are trademarks of International Business Machines Corporation). That is, cognitive reasoning, analytics and/or artificial intelligence (AI) may be used to recognize behavior, intent, and ADL's of the recipient 408, understand behavior of recipient 408, search known information about the recipient 408 (e.g., schedules and locations associated with the recipient 408) and/or use historical data about recipient 408 or group of recipients.

The machine learning component 480 may include using one or more heuristics and machine learning based models for performing one or more of the various aspects as described herein. In one aspect, the IoT device compliance service and machine learning based models may be performed using a wide variety of methods or combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, back propagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting example of temporal difference learning may include Q-learning and learning automata. Specific details regarding any of the examples of supervised, unsupervised, temporal difference or other machine learning described in this paragraph are known and are considered to be within the scope of this disclosure. Also, when deploying one or more machine learning models, a computing device may be first tested in a controlled environment before being deployed in a public setting. Also, even when deployed in a public environment (e.g., external to the controlled, testing environment), the computing devices may be monitored for compliance.

In view of the foregoing FIGS. 1-4, consider the following operation example using real time package delivery (RTD) services using the various components, functionalities, and operations of FIGS. 1-4 for coordinating package delivery between a shipper and a recipient at a location other than the recipient's originally scheduled location (e.g., home) and at a time other than the time the package would normally be delivered to the recipient's originally scheduled location. For example, a recipient may indicate a desire to meet the shipping company's driver at one of several intercept points most convenient to the recipient to retrieve the package.

Accordingly, consider the following steps of operations for a recipient to register for a shipper's RTD service. Step 1) a recipient may use a graphical user interface ("GUI") of a computing device to access an application of the delivery service to register a home address and any of the recipient's vehicles, which may be used when meeting the shipping company's driver at a designated intercept location. Step 2), the recipient agrees to turn on location services for an IoT device (e.g., a mobile device of the recipient) when meeting the shipping company's driver at an intercept point. Step 3), the recipient's information may be stored in the shipping company's database.

Additionally, consider the following steps of operations for a recipient for notifying the shipping company that a recipient would like to take delivery of a package at an intercept location. In step 1), using the shipping company's delivery service application, the recipient indicates an intent/desire to take delivery of the package at a time other than the originally scheduled time to be delivered (e.g., this time may also be unknown) and at a location other than the specified delivery address. In step 2) a determination operation may be performed to identify a current location of the package (e.g., the shipping company's database may be queried to determine which delivery vehicle and driver has the recipient's package). In step 3), using a driver's location services, all remaining intercept locations for the identified driver may be identified.

In step 4), using the recipient's location services (e.g., using an IoT computing device to identify the location of the recipient), all possible intercept locations available to the recipient's current location may be identified, learned, and/or sorted them by time to intercept. As alternatives to and/or in conjunction with Step 4, in step 4a) an operation may be executed for the user to select a time and identify a nearest intercept location for that selected time. In step 4b) a nearest intercept location at the selected time may be identified, selected, and/or arranged between the recipient and the delivery service to arrange for meeting the recipient at that intercept location.

In step 5), the recipient may select an intercept location and indicates an intent to meet the driver at that location. In step 6), the shipping company's database may be updated, and the driver may be notified, in real time, of the intercept location, the package ID, the recipient's name, and the recipient's vehicle location. In step 7), the recipient may be notified that the intercept location and time has been confirmed. In step 8), the recipient arrives at the intercept location at least an agreed to amount of time before the delivery vehicle arrives. In step 9), the driver may be notified that the recipient's vehicle has arrived at the intercept location (this may include a real time map). In step 10), the recipient may be notified that the driver is approaching the intercept location (this may include a real time map). In step 11), the delivery service (e.g., delivery driver) may stop at the intercept location and deliver the package to the recipient. In step 12), the recipient may confirm and acknowledge receipt of the package through the shipping company's application. In step 13), the shipping company's database may be updated with the recipient's confirmation.

Figure 5:
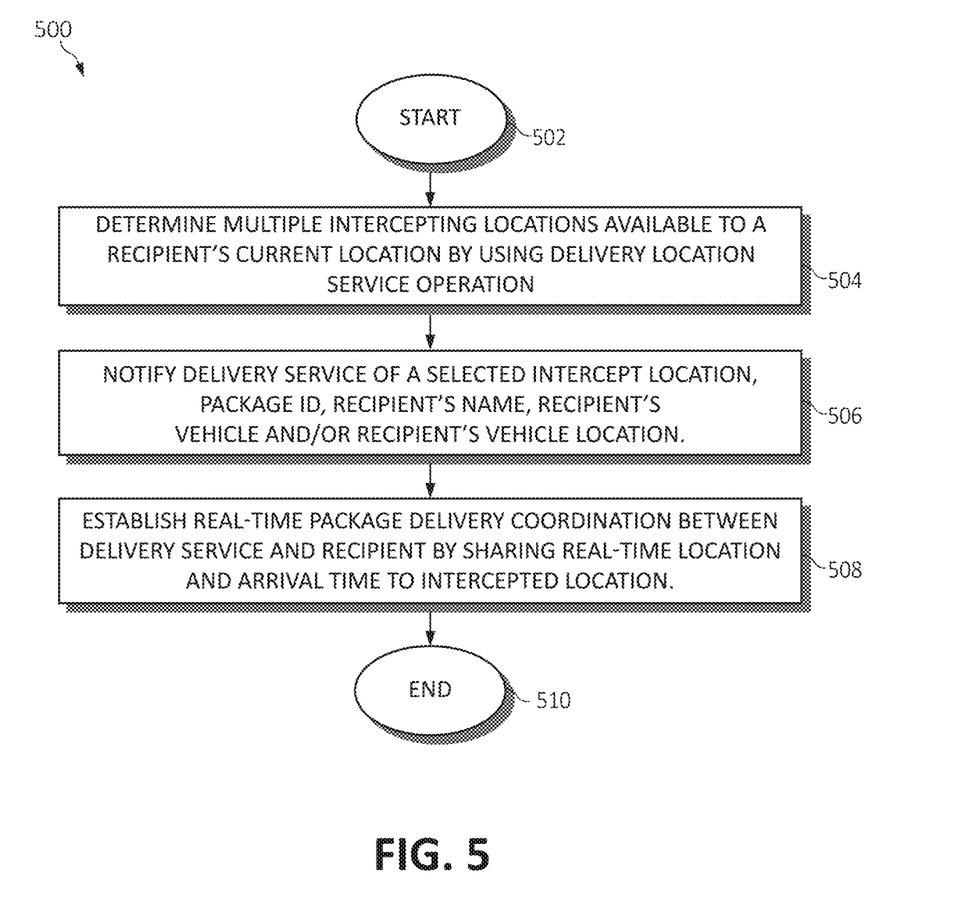
FIG. 5 is an additional flowchart diagram depicting an exemplary method for managing real time parcel delivery in an internet of things (IoT) computing environment in accordance with aspects of the present invention.

Turning now to FIG. 5, a method 500 for managing real time parcel delivery in a computing environment by a processor is depicted, in which various aspects of the illustrated embodiments may be implemented. The functionality 500 may be implemented as a method executed as instructions on a machine, where the instructions are included on at least one computer readable medium or one non-transitory machine-readable storage medium. The functionality 500 may start in block 502.

Multiple intercepting locations (e.g., all possible locations) available to a recipient's current location may be determined using a delivery location service operation (e.g., using a delivery driver's location service), as in block 504. A delivery service may be notified of a selected intercept location, package ID, recipient's name, recipient's vehicle and/or recipient's vehicle location (or a combination thereof), as in block 506. Real-time package delivery coordination between delivery service and recipient may be established by sharing real-time location and arrival time to intercepted location, as in block 508. The functionality 500 may end, as in block 510.

Figure 6:
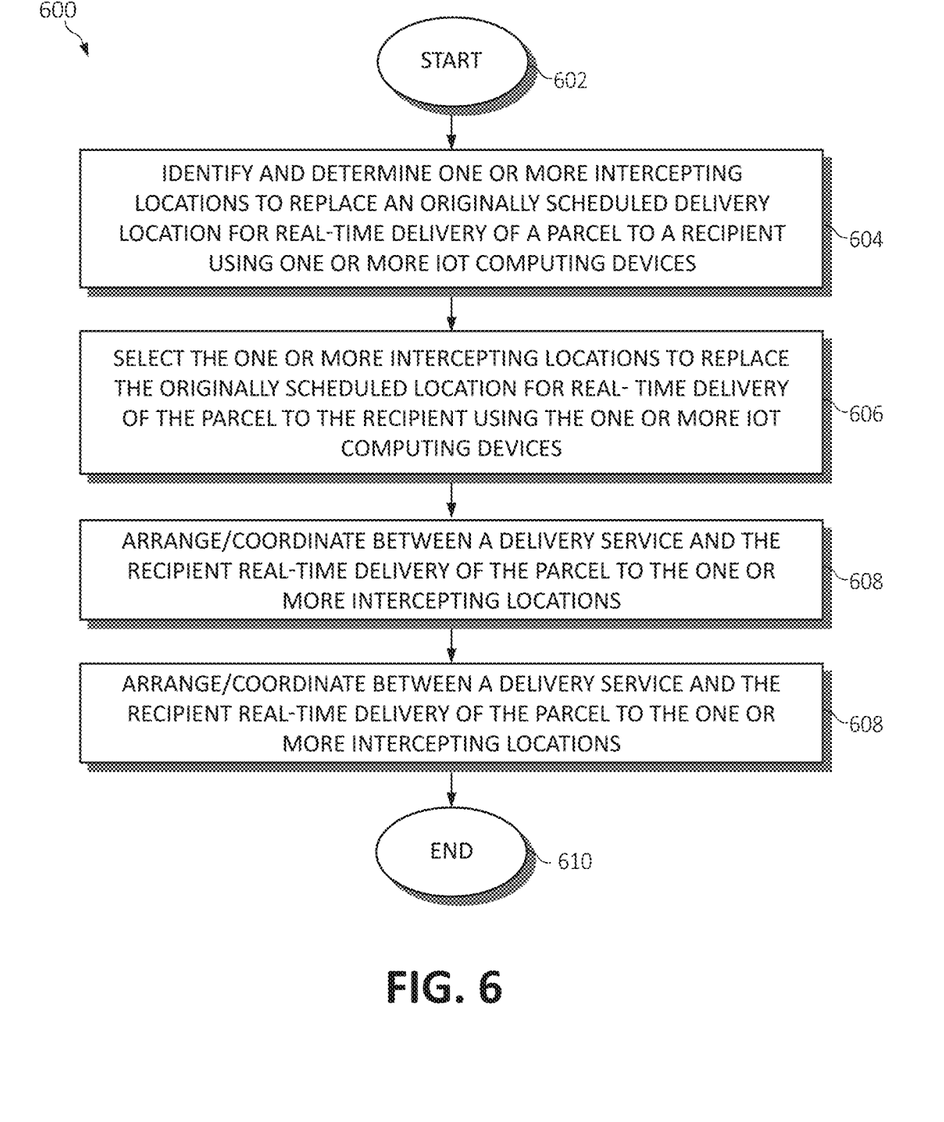
FIG. 6 is an additional flowchart diagram depicting an additional exemplary method for managing real time parcel delivery in computing environment by a processor, again in which aspects of the present invention may be realized.

Turning now to FIG. 6, a method 600 for managing real time parcel delivery in a computing environment by a processor is depicted, in which various aspects of the illustrated embodiments may be implemented. The functionality 600 may be implemented as a method executed as instructions on a machine, where the instructions are included on at least one computer readable medium or one non-transitory machine-readable storage medium. The functionality 600 may start in block 602.

One or more intercepting locations may be identified and determined to replace an originally scheduled delivery location for real-time delivery of a parcel to a recipient using one or more IoT computing devices, as in block 604. The one or more intercepting locations may be selected to replace the originally scheduled location for real-time delivery of the parcel to the recipient using the one or more IoT computing devices, as in block 606. Real-time delivery of the parcel to the one or more intercepting locations may be arranged/ coordinated between a delivery service and the recipient, as in block 608. The functionality 600 may end, as in block 610.

In one aspect, in conjunction with and/or as part of at least one block of FIGS. 5 and/or 6, the operations of methods 500 and/or 600 may include each of the following. The operations of methods 500 and/or 600 may identify the one or more intercepting locations available to the recipient of the parcel, available to the delivery service, available to an identified third party approved for receiving the parcel, or a combination thereof, and/or identify the one or more intercepting locations according calendar data, location information of one or more IoT computing devices associated with the recipient, location information of one or more vehicles, or a combination thereof.

An updated delivery time may be selected to replace an original location time at the one or more intercepting locations. The delivery service (e.g., delivery driver) may be alerted and/or notified of the one or more intercepting locations, a parcel identifier (ID), a name of the recipient, vehicle information associated with the recipient, location information of one or more IoT computing devices associated with the recipient, location information of the vehicle associated with the recipient, or a combination thereof. The recipient may be alerted of an arrival time of a transport vehicle delivering the parcel to one or more intercepting locations. The operations of methods 500 and/or 600 may sort and/or arrange the one or more intercepting locations according to defined delivery criteria.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for managing real time parcel delivery in an internet of things (IoT) computing environment by a processor, comprising:
   monitoring behavioral data of a recipient over a selected time period using one or more IoT computing devices, wherein the monitored behavioral data is stored;
   executing machine learning logic to develop a behavioral data model trained according to the monitored behavioral data, wherein the trained behavioral data model identifies patterns of events and schedules of the recipient;
   selecting one or more intercepting locations to replace an originally scheduled location for real-time delivery of a parcel to the recipient using the one or more IoT computing devices and the trained behavioral data model, wherein the one or more intercepting locations comprise an impromptu and mutually-agreeable location, between a delivery service and the recipient, on an existing parcel route of the delivery service in which the recipient will predictively and temporarily be located during a course of deliveries on the parcel route, and wherein the one or more intercepting locations are derived by recursively parsing real-time local device data from the one or more IoT computing devices to obtain real-time location data and predicted future location data of the recipient according to the trained behavioral data model; and
   arranging with a delivery service the real-time delivery of the parcel to the one or more intercepting locations, notwithstanding whether the delivery service employs or utilizes a person to accomplish the real-time delivery of the parcel.

2. The method of claim 1, further including identifying the one or more intercepting locations available to the recipient of the parcel, available to the delivery service, available to an identified third party approved for receiving the parcel, or a combination thereof.

3. The method of claim 1, further including identifying the one or more intercepting locations according to calendar data, location information of one or more IoT computing devices associated with the recipient, location information of one or more vehicles, or a combination thereof.

4. The method of claim 1, further including selecting an updated delivery time to replace an original location time at the one or more intercepting locations.

5. The method of claim 1, further including notifying the delivery service of the one or more intercepting locations, a parcel identifier (ID), a name of the recipient, vehicle information associated with the recipient, the real-time location data of the one or more IoT computing devices associated with the recipient, location information of the vehicle associated with the recipient, or a combination thereof.

6. The method of claim 1, further including alerting the recipient of an arrival time of a transport vehicle delivering the parcel to one or more intercepting locations.

7. The method of claim 1, further including sorting the one or more intercepting locations according to defined delivery criteria.

8. A system for managing real time parcel delivery in an internet of things (IoT) computing environment, comprising:
   one or more computers with executable instructions that when executed cause the system to:
      monitor behavioral data of a recipient over a selected time period using one or more IoT computing devices, wherein the monitored behavioral data is stored;
      execute machine learning logic to develop a behavioral data model trained according to the monitored behavioral data, wherein the trained behavioral data model identifies patterns of events and schedules of the recipient;
      select one or more intercepting locations to replace an originally scheduled location for real-time delivery of a parcel to the recipient using the one or more IoT computing devices and the trained behavioral data model, wherein the one or more intercepting locations comprise an impromptu and mutually-agreeable location, between a delivery service and the recipient, on an existing parcel route of the delivery service in which the recipient will predictively and temporarily be located during a course of deliveries on the parcel route, and wherein the one or more intercepting locations are derived by recursively parsing real-time local device data from the one or more IoT computing devices to obtain real-time location data and predicted future location data of the recipient according to the trained behavioral data model; and
      arrange with a delivery service the real-time delivery of the parcel to the one or more intercepting locations, notwithstanding whether the delivery service employs or utilizes a person to accomplish the real-time delivery of the parcel.

9. The system of claim 8, wherein the executable instructions further identify the one or more intercepting locations available to the recipient of the parcel, available to the delivery service, available to an identified third party approved for receiving the parcel, or a combination thereof.

10. The system of claim 8, wherein the executable instructions further identify the one or more intercepting locations according to calendar data, location information of one or more IoT computing devices associated with the recipient, location information of one or more vehicles, or a combination thereof.

11. The system of claim 8, wherein the executable instructions further select an updated delivery time to replace an original location time at the one or more intercepting locations.

12. The system of claim 8, wherein the executable instructions further notify the delivery service of the one or more intercepting locations, a parcel identifier (ID), a name of the recipient, vehicle information associated with the recipient, the real-time location data of the one or more IoT computing devices associated with the recipient, location information of the vehicle associated with the recipient, or a combination thereof.

13. The system of claim 8, wherein the executable instructions further alert the recipient of an arrival time of a transport vehicle delivering the parcel to one or more intercepting locations.

14. The system of claim 8, wherein the executable instructions further sort the one or more intercepting locations according to defined delivery criteria.

15. A non-transitory computer-readable storage medium containing computer-readable program code having executable portions for managing real time parcel delivery in an internet of things (IoT) computing environment, the executable portions, when executed by a processor, causing the processor to perform the executable portions that comprise:
 an executable portion that monitors behavioral data of a recipient over a selected time period using one or more IoT computing devices, wherein the monitored behavioral data is stored;
 an executable portion that executes machine learning logic to develop a behavioral data model trained according to the monitored behavioral data, wherein the trained behavioral data model identifies patterns of events and schedules of the recipient;
 an executable portion that selects one or more intercepting locations to replace an originally scheduled location for real-time delivery of a parcel to the recipient using the one or more IoT computing devices and the trained behavioral data model, wherein the one or more intercepting locations comprise an impromptu and mutually-agreeable location, between a delivery service and the recipient, on an existing parcel route of the delivery service in which the recipient will predictively and temporarily be located during a course of deliveries on the parcel route, and wherein the one or more intercepting locations are derived by recursively parsing real-time local device data from the one or more IoT computing devices to obtain real-time location data and predicted future location data of the recipient according to the trained behavioral data model; and
 an executable portion that arranges with a delivery service the real-time delivery of the parcel to the one or more intercepting locations, notwithstanding whether the delivery service employs or utilizes a person to accomplish the real-time delivery of the parcel.

16. The non-transitory computer-readable storage medium of claim 15, further including an executable portion that:
 identifies the one or more intercepting locations available to the recipient of the parcel, available to the delivery service, available to an identified third party approved for receiving the parcel, or a combination thereof; or
 identifies the one or more intercepting locations according to calendar data, location information of one or more IoT computing devices associated with the recipient, location information of one or more vehicles, or a combination thereof.

17. The non-transitory computer-readable storage medium of claim 15, further including an executable portion that further selects an updated delivery time to replace an original location time at the one or more intercepting locations.

18. The non-transitory computer-readable storage medium of claim 15, further including an executable portion that notifies the delivery service of the one or more intercepting locations, a parcel identifier (ID), a name of the recipient, vehicle information associated with the recipient, the real-time location data of the one or more IoT computing devices associated with the recipient, location information of the vehicle associated with the recipient, or a combination thereof.

19. The non-transitory computer-readable storage medium of claim 15, further including an executable portion that further alerts the recipient of an arrival time of a transport vehicle delivering the parcel to one or more intercepting locations.

20. The non-transitory computer-readable storage medium of claim 15, further including an executable portion that further sorts the one or more intercepting locations according to defined delivery criteria.

\* \* \* \* \*